United States Patent [19]

Golding

[11] Patent Number: 5,124,981

[45] Date of Patent: Jun. 23, 1992

[54] ACCESS CONTROL METHOD FOR DQDB NETWORK

[75] Inventor: Neville L. Golding, Mebane, N.C.

[73] Assignee: International Business Machines Corporation, Armonk, N.Y.

[21] Appl. No.: 494,636

[22] Filed: Mar. 9, 1990

[51] Int. Cl.$^5$ ............................................. H04J 3/02
[52] U.S. Cl. .................................. 370/85.1; 370/94.1; 370/85.9; 370/85.6; 340/825.5
[58] Field of Search ......................... 370/85.9, 85.6, 93, 370/85.1, 94.1; 340/825.05, 825.5

[56] References Cited

U.S. PATENT DOCUMENTS

| | | | |
|---|---|---|---|
| 4,701,910 | 10/1987 | Ulug | 370/85.9 |
| 4,718,061 | 1/1988 | Turner | 370/85.6 |
| 4,922,244 | 5/1990 | Hullett et al. | 370/85.6 |
| 4,977,557 | 12/1990 | Phung et al. | 370/85.9 |
| 5,001,707 | 3/1991 | Kositpaiboon et al. | 370/85.1 |
| 5,051,742 | 9/1991 | Hullett et al. | 370/94.1 |

Primary Examiner—Douglas W. Olms
Assistant Examiner—Dang Ton
Attorney, Agent, or Firm—Gerald R. Woods

[57] ABSTRACT

A distributed queue dual bus (DQDB) network has two, oppositely-directed, unidirectional busses. A node with data to send on one bus, can request access to that bus, by sending a bus request signal to all nodes upstream on the bus. The bus request signal is sent to the nodes as part of the traffic flowing on the second bus. Each node counts the number of successive bus request signals transported on the second bus. In a multiple priority system, multiple counts are maintained, one for each priority level. When a given or local node detects an idle slot on the first node, it may write data into that slot if there are no pending downstream access requests of higher priority and if the local node has allowed enough idle slots to pass since its last write operation to service access requests existing at the time of that operation at the same or higher priority levels.

2 Claims, 5 Drawing Sheets

| TIME | EVENT | REQUEST BIT PATTERN (4 SUCCESSIVE CELLS) | | | |
|---|---|---|---|---|---|
| | | E→D | D→C | C→B | B→A |
| T0 | ALL SLOTS BUS A BUSY NO ACCESS REQUESTS | 0000 | 0000 | 0000 | 0000 |
| T1 | NODE 76D REQUESTS ACCESS | 0000 | 0101 | 0101 | 0101 |
| T2 | NODE 76B REQUESTS ACCESS | 0000 | 0101 | 0101 | 0110 |
| T3 | NODE 76C REQUESTS ACCESS | 0000 | 0101 | 0110 | 0111 |
| T4 | FREE SLOT USED BY NODE 76B | 0000 | 0101 | 0110 | 0110 |
| T5 | FREE SLOT USED BY NODE 76C | 0000 | 0101 | 0101 | 0101 |
| T6 | FREE SLOT USED BY NODE 76D | 0000 | 0000 | 0000 | 0000 |

ACCESS CONTROL METHOD FOR DQDB NETWORK

FIELD OF THE INVENTION

The present invention relates to data communications networks and more particularly to a method of controlling access by individual nodes to busses in a Distributed Queue Dual Bus (DQDB) network.

PRIOR ART

A DQDB network is defined as a network having dual, unidirectional busses which carry data in opposite directions.

A DQDB network may be a significant component or subnetwork for a metropolitan area network, a term which is generally defined as covering a network which can transmit both voice and data information throughout a limited geographic area at data rates exceeding a predetermined threshold rate. The size of the area and the threshold data rate are the subject of discussion in industry standards groups.

Nodes in a DQDB network are connected in parallel to both of the unidirectional busses. Each node can read data being transported on a bus and can modify data as it passes the node on the bus; that is, can read from and write to the bus.

Each bus is viewed as originating at a single node, referred to as a head-of-bus (or simply head) node, and as terminating at a single node, referred to as an end-of-bus or tail node. The same node serves as the head of one of the busses and as the tail of the other. Data being transported on the busses is discarded or lost at the tail node after being read there. There is no wrapping of data from one of the busses to the other at any node, including the head and tail nodes.

While timing signals for both busses may be derived from a single timing source, read/write operations with respect to each bus are performed independently and asynchronously, providing effective full duplex communications between any two nodes.

Data is normally transported along each bus in successive fixed length slots. In this specification, the term slot is used to refer to the time segment in which data may be transported while the term cell is used to refer to the unit of data being transported in that slot. According to one proposed standard, each data cell is fifty-three bytes long. The fifty-three bytes are divided into a five byte header and a forty-eight byte data segment, sometimes referred to as the payload segment of the cell. As a byte is 8 bits, the individual bytes are sometimes referred to as octets.

The first byte or octet in each header is an access control field including a busy bit and a subfield of four reservation bits. The three remaining bits in the access control field are reserved or perform defined functions that are not relevant to the present invention.

The value of the busy bit indicates whether the slot is busy (already occupied by information written into the slot by an upstream node) or idle (available for data if the node has any to send). Conventionally, a binary 1 in the busy bit position indicates an occupied slot while a binary 0 indicates an idle or available time slot.

Each of the four bits in the reservation field indicates whether a downstream node has data to send. Each bit position in the reservation field is assigned to one of four priority levels. To simplify the following explanation, it will be assumed temporarily that the system is a single priority system; that is, that there is a single bit in the reservation field of the access control field.

In a basic DQDB system, a node that has data to send on one of the busses, arbitrarily designated as Bus A, requests access to Bus A by writing a reservation bit into the next available cell on bus B. The next available cell is one which, upon arrival at the node via Bus B, has a binary 0 in the reservation field bit. A node requesting access changes the bit value to a binary 1 as the cell passes.

Each succeeding node on Bus B reads the binary value of the reservation field bit. If the node is not currently requesting access to Bus A itself, a Request (RQ) counter is incremented for each reservation bit received in a cell on Bus B. The RQ counter is decremented by one count for each idle slot passing the node on Bus A since the idle slot can be utilized by one of the nodes downstream on Bus A. Thus, the current RQ count indicates the number of currently unsatisfied reservation requests for access to Bus A by nodes downstream on Bus A.

When a node initiates a request for access to Bus A, the current RQ count is transferred to a countdown (CD) counter in the node. The RQ counter is then reset to zero. The CD counter is decremented by one for each idle slot passing the node on Bus A while the RQ counter begins to count newly arrived reservation bits. When the CD counter reaches zero, the node writes its data into the passing idle slot for propagation along Bus A.

The above description assumes a single priority system. A multiple priority system is accommodated with relatively minor changes. In a multiple priority system, an RQ counter and a CD counter is assigned to each priority level. In a multiple priority system where a node is not requesting access to Bus A, the node's RQ counter (for a particular priority level) counts reservation bits received for that priority level and all higher levels. If the node is requesting access to Bus A, the CD counter continues to be decremented for each idle slot detected on Bus A but is also incremented for each reservation bit counted in the RQ counter.

In an ideal system, the basic DQDB protocol described above would permit the first node with an access request to claim the first available slot and every slot would be perfectly utilized. Unfortunately, propagation delays that exist in any real system prevent a DQDB system from responding ideally. Access requests that originate in downstream nodes may be delayed during propagation along a bus so that an upstream node with a later access request will be first to claim an available time slot. Propagation delays, in combination with delays attributable to processing of access request signals, can result in preferential treatment of nodes closer to the head of the bus.

The unfairness of the basic DQDB protocol has been recognized and several access control methods have been proposed to alleviate that unfairness.

One such method is referred to as BandWidth Balancing or BWB. This method requires the presence of a BWB counter at each node and a selection of a BWB modulus. Bandwidth balancing is established if the BWB modulus has a nonzero, positive value. If a node writes data into an idle slot on one of the busses (assume Bus A), the BWB counter at the node is incremented. If the incremented BWB count equals the selected modulus, the BWB counter is reset to zero.

At each zero count, an idle slot is allowed to pass the node so that it can be used by a downstream node. The idle slot is allowed to pass even if the subject node has another access request pending. This is achieved by incrementing every RQ counter at the node for priority levels for which no access requests are queued and by incrementing all CD counters at the node for those priority levels having queued access requests.

The BWB method does not provide a complete solution to the unfairness problem. For one thing, the method does not adequately consider the priority levels assigned to access requests and can result in inappropriate handling of high priority access requests. For another, the method does not fully utilize available time slots and may not achieve fairness simply because it takes so long to work. By the time the system has rebalanced the bandwidth, by passing empty slots to a downstream node, that node may no longer need the slots.

A proposed alternative method would require that a node send a single reservation request when it first finds it needs access to the bus, rather than for each unit of data it wishes to send. The node would also transmit an idle signal when access is no longer needed. The use of a single reservation request reduces the number of requests which must be processed and, potentially, any queueing delays associated with that processing. The impact of propagation delays is also reduced.

The originators of this approach have acknowledged at least two problems. First, the access control field structure of the presently defined DQDB system does not allow four levels of request and idle signals. Second, the approach requires occasional reset signals to ensure correction operation in the presence of line signal errors. The occurrence of the reset signals can lead to propagation and access delays.

SUMMARY OF THE INVENTION

The present invention is a simple access control method which does not require redefinition of the DQDB access control field, but which minimizes impact of propagation delays and optimizes utilization of available bus bandwidth.

The invention is implemented in a dual bus system in which a first bus is assumed to carry bus request signals in one direction while a second bus is assumed to carry data in a second direction. In accordance with the present invention, each node continuously tracks the number of nodes requiring access to the second bus by counting successive bus request signals received on the first bus. If the counting node also desires access to the second bus, it adds a bus request signal to the stream, thereby increasing the number of successive signals seen by the next node on the first bus. The node concurrently looks for idle slots on the second bus. The node will write data into the first available idle slot and then allow a number of idle slots to pass before it attempts to regain access to the second bus. The number of idle slots which are allowed to pass equals the number of nodes downstream on the second bus for which the subject node has received access requests.

BRIEF DESCRIPTION OF THE DRAWINGS

While the specification concludes with claims particularly pointing out and distinctly claiming that which is regarded as the present invention, details of preferred embodiments of the invention may be more readily ascertained from the following detailed description, when read in conjunction with the accompanying drawings wherein:

DETAILED DESCRIPTION

Figure 1:
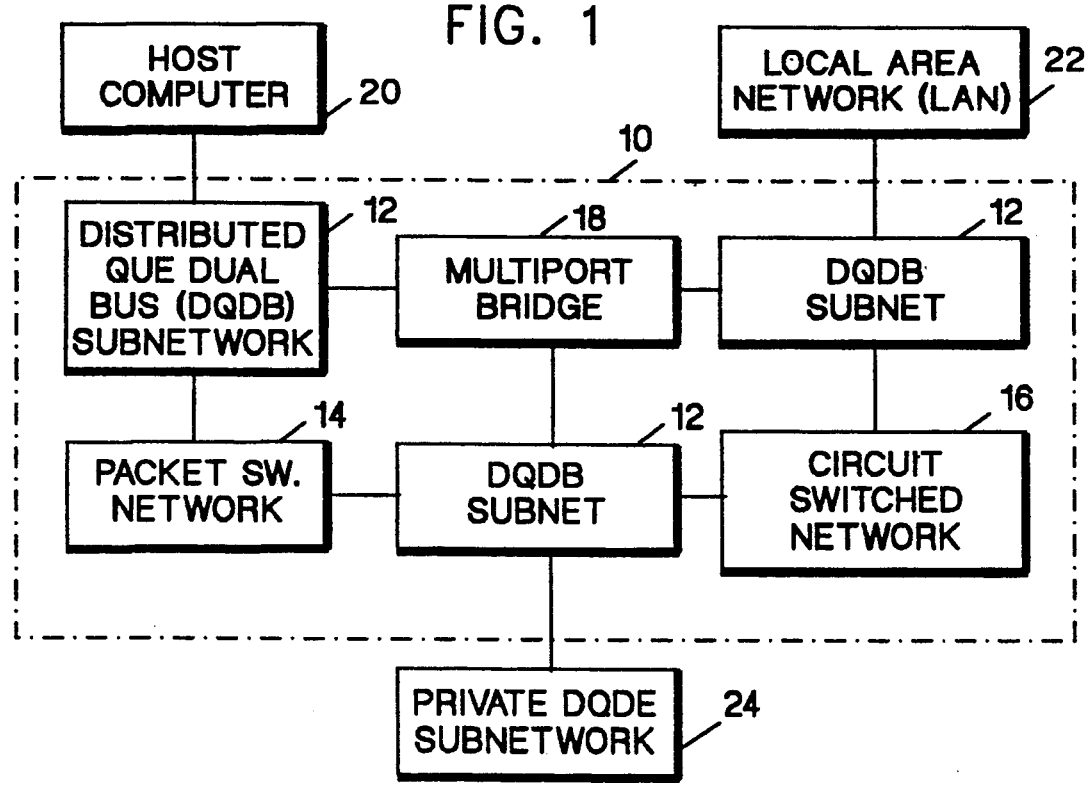
FIG. 1 is a system level block diagram illustrating an environment for a public DQDB system.

FIG. 1 shows, at a block diagram level, various components of a metropolitan area network 10. A metropolitan area network is one which may provide integrated voice and data transmission services for different corporate or individual users within a limited geographic (metropolitan) area. A metropolitan area network may include DQDB subnetworks 12 for carrying voice and data signals originating with different users throughout the area. DQDB networks may be linked through other known types of networks, such a high speed packet switching network 14 or a circuit switched network 16. DQDB networks can also be linked through a multiport bridge 18.

Each network component in a metropolitan area network may be viewed either as a subnetwork or as a network, depending on the context in which the component is being considered. When considered as a part of the metropolitan area network in which it resides, the component has subnetwork status. When considered on its own, the same component is considered to have network status.

DQDB subnetworks within a metropolitan area network may be connected to external data sources/sinks, such as a privately owned host computer 20, a local area network or LAN 22 or even a privately owned DQDB network 24.

Neither the detailed configuration of the metropolitan area network nor the details of the various components (other than the DQDB subnetworks) of the metropolitan area network is essential to an understanding the present invention.

Figure 2:
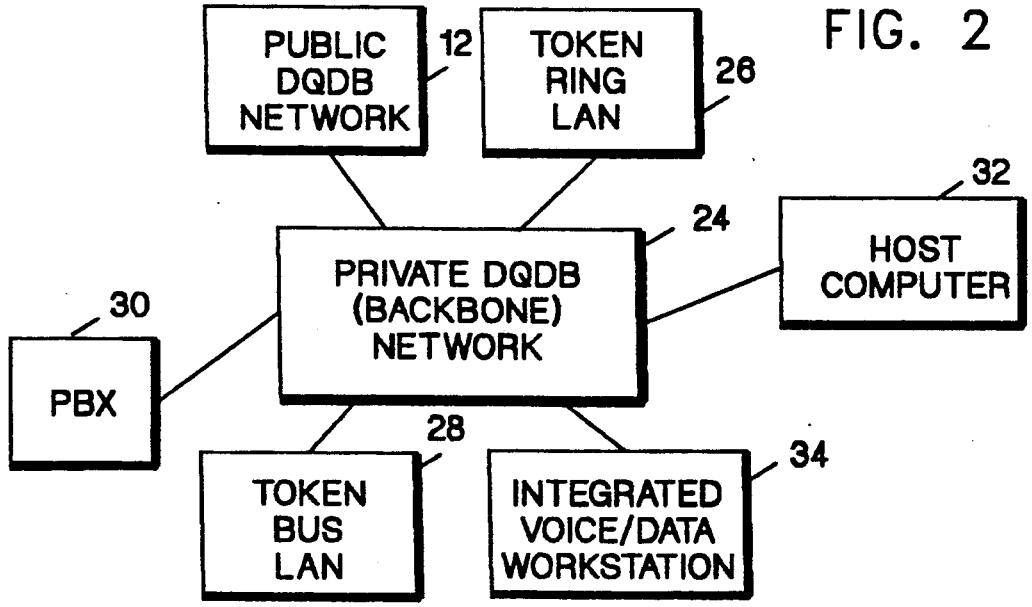
FIG. 2 is a system level block diagram illustrating an environment for a private DQDB system.

A private DQDB ne(work, such as network 24, may support a number of directly-attached components. As shown in FIG. 2, the private DQDB network 24 may be connected both to the public DQDB network 12 and to privately owned data processing systems, such as a token ring LAN 26, a token bus LAN 28, a PBX 30 and a host computer 32. The private DQDB network 24 may even support directly-attached, integrated voice/-data workstations, such as workstation 34.

Figure 3:
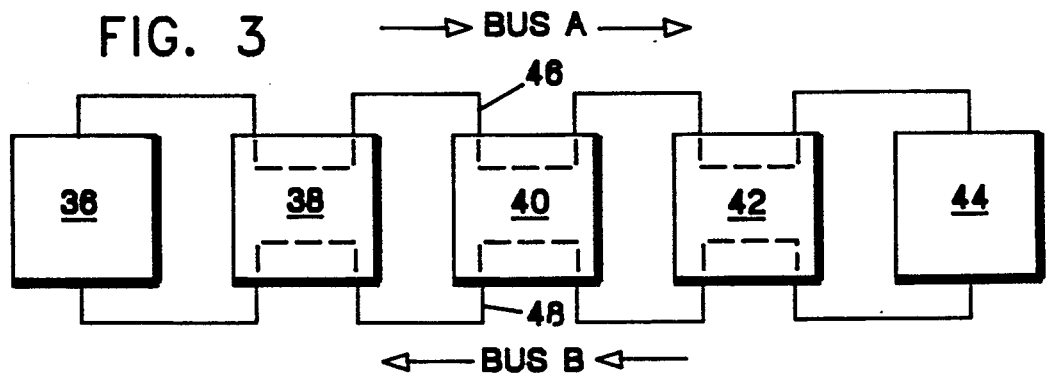
FIG. 3 is a block diagram of the dual busses and nodes which exist in any DQDB network.

FIG. 3 shows a simple DQDB network, consisting of five nodes 36, 38, 40, 42 and 44. The nodes are connected in parallel to two unidirectional busses 46 (or Bus A) and 48 (or Bus B). Node 36 is considered to be the head of Bus A and the tail of Bus B. Node 44 is considered to be the tail of Bus A and the head of Bus B. All data on a bus flows from its head towards its tail. Bus A and Bus B function independently of one another, even though the timing for operations on both busses may be derived from a single timing source at one of the nodes.

The two busses, considered together, provide effective full duplex communications between any two nodes. For example, node 36 may send data to node 42 on Bus A at the same time node 42 is sending data to node 36 on Bus B.

Figure 4:
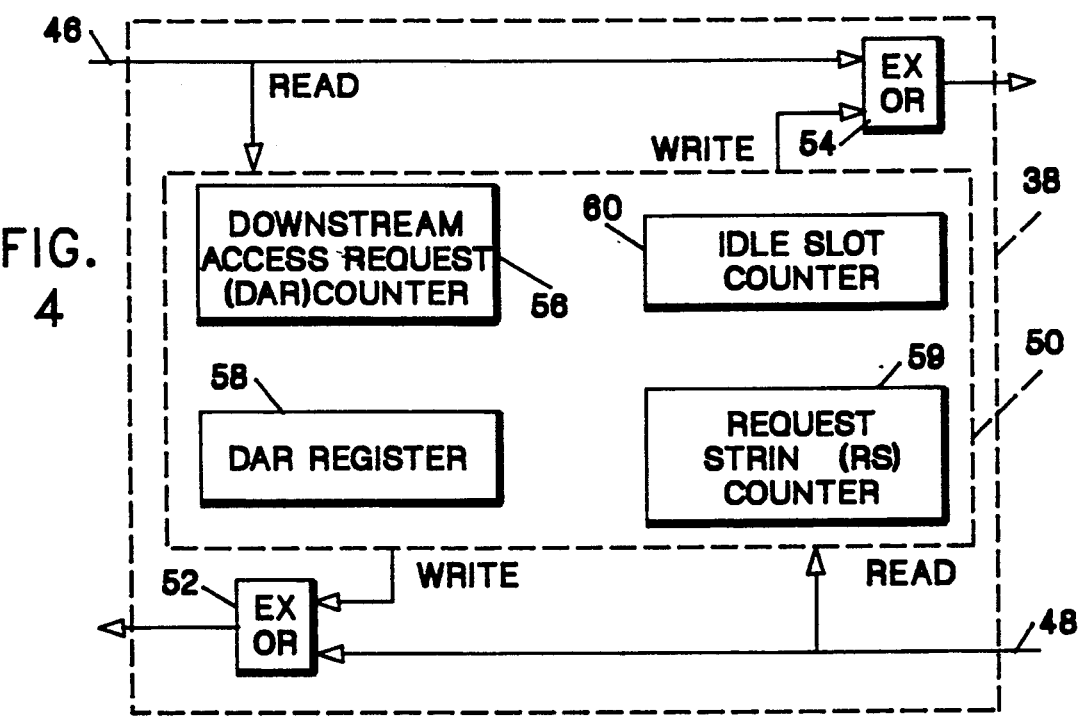
FIG. 4 is a slightly more detailed diagram of an individual node in a DQDB system.

FIG. 4 is a slightly more detailed view of a node. The node is arbitrarily labelled as node 38 although the description which follows applies to any generalized node in a DQDB system. The node includes an access unit 50 which can read data from each of the busses 46 and 48 and can modify that data as is passes the access unit on the bus. Data passing node 38 on bus 46 is modified or written through the use of an exclusive OR circuit 54 having inputs from bus 46 and from the access unit 50. Data being transported on bus 48 can be modified at an exclusive OR circuit 52 connected both to that bus and the access unit 50. Except as noted below, the details of the access unit 50 are not important to an understanding of the present invention. Further, it should be noted that exclusive OR circuits only one way to perform a write function on the bus. Another way to perform the same function would be use a conventional read / erase / write logic in the access unit 50.

Control of access to the busses by the node involves multiple sets of access controlling counters and registers. A set is assigned for each priority level on each bus and includes three different counters and a register. A single set is described below.

The following description uses the terms upstream and downstream to define the location of one node relative to another (local) node. An upstream node is one which receives data before the local node. A downstream node is one which receives data after the local node. Care must be exercised in interpreting the terms in any description of a DQDB system since a node which is upstream from a local node on one of the dual busses is considered to be downstream of the same local node on the other of the dual busses.

One of counters in each set is a Downstream Access Request or DAR counter 56 which is used to count the number of downstream nodes which are currently requesting access to a particular bus.

Requests for access to one bus are forwarded to the local node in the form of request bits in cells arriving on the other bus. For example, nodes downstream of node 38 on bus 46 can request access to that bus by including request bits in cells transported to node 38 on bus 48. As will be described in more detail later, each DAR counter actually counts the number of successive bus request bits at each priority level in cells being transported on bus 48.

Each access control set also includes a DAR register 58 which is used to store a count of downstream access requests. The relationship between the DAR counter 56 and the DAR register 58 is discussed later.

Each set further includes an idle slot counter 60, the basic function of which is to make sure the node allows an adequate number of idle slots to be delivered to downstream nodes to satisfy access requests from those nodes. More details about the operation of counter 60 are provided later.

Finally, each set includes a request string or RS counter, the basic function of which is to pass on the appropriate number of successive request bits to the next upstream node. The operation of the RS counter is described later.

Figure 5:
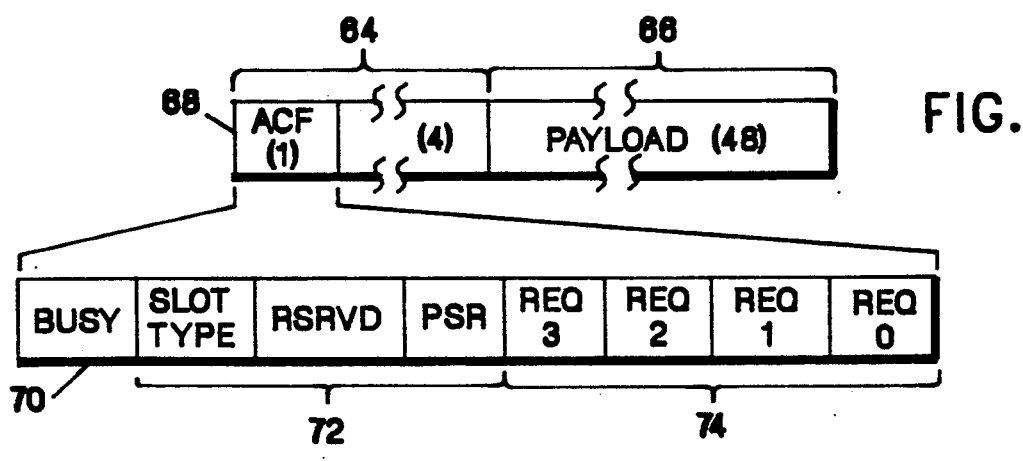
FIG. 5 shows the format of a standard information cell in a DQDB system.

FIG. 5 shows the format of information cells which are transported in successive time slots along each of the dual busses. The figure does not show the cell delimiters and any data integrity checking characters that might be used as these are well known.

Each cell is currently defined as being a fixed length or fifty-three byte cell. The cell is divided into a five byte header 64 and a forty-eight byte data or payload segment 66. The first byte or octet 68 in header 64 is an access control field 68, shown in expanded form in the figure.

The access control field for a cell includes a busy bit position 70 which indicates whether the cell's payload segment is busy (carrying data provided at an upstream node) or idle. If the payload segment is idle, the node receiving the cell may write data into the segment if certain conditions are satisfied. Those conditions are discussed below. Conventionally, a binary 1 in bit position 70 indicates a busy or occupied cell while a binary 0 indicates an idle cell.

The access control field includes three additional bit positions in a segment 72. These bits are not employed in the access control method to be described and will be ignored.

The remainder of the access control field comprises a request field 74, shown as having 4 bit positions. Each of the bit positions is associated with a particular priority level in a preferred embodiment of the invention. A binary 1 received in a particular bit position in request field 74 is construed as a request by another node for access to the other bus at the priority level associated with the bit position. For example, if REQ3 is considered the highest priority level and REQ0 the lowest, a request field received on bus 48 with a bit pattern 1001 is construed as containing requests for access to bus 46 by two downstream (on bus 46) nodes, one at each of the highest and lowest priority levels.

Given this structure, it is implicit that each cell can contain only one access request per priority level but may contain as many as four access requests—one for each of the four possible priority levels.

In accordance with the present invention, access to a bus is a function of the number of downstream nodes that wish to access that bus. Access is not a function of the number of data segments that those nodes wish to write onto the bus. Thus, referring to FIG. 6, if node 76D wants to write two data segments to Bus A and node 76C wants to write fifty data segments to Bus A, node 76B will know only that two downstream nodes wish to use Bus A. Node 76B won't know which two nodes or how much data each of those nodes has to send.

Each local node acquires knowledge about the number of downstream nodes that are requesting access by counting the number of bus request signals (binary 1's) received in each bit position in request fields in successively received cells. When the local node wishes to access the bus itself, it uses the first available idle slot on the bus for its data. It then allows idle slots to pass to the downstream nodes to service their access requests before it attempts to regain access to the bus.

Figure 6:
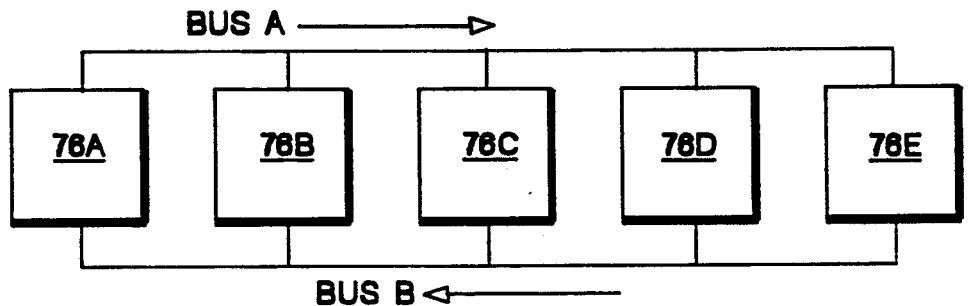
FIG. 6 is a time chart showing successive bit patterns which occur at a given priority level in a five node system for a given sequence of access requests.

FIG. 6 is a time chart of the results of the process and assumes a single priority system for ease of explanation. It is assumed initially that none of nodes 76B through 76E is requesting access to Bus A but that node 76A is currently using every slot on Bus A. The initial situation is illustrated at time T0. Under these conditions each node sees four successive 0 request bits in four successive cells being transmitted along Bus B.

If, at time T1, node 76D requests access to Bus A, it notifies nodes 76A, 76B and 76C of this request by changing the pattern of request bits being transported on Bus B. The new pattern delivered to those nodes (in four successive cells on Bus B) takes the form of alternating 0's and 1's or 0101. This pattern is interpreted by nodes 76A, 76B and 76C as meaning that one downstream node is requesting access to Bus A.

If, at time T2, node 76B requests access to Bus A. that node notifies node 76A of the request by adding a binary 1 to the request bit pattern on Bus B. Node 76A then receives a repeated 011 pattern. Node 76B and node 76C continue to receive the repeated 01 pattern since only one node downstream of those nodes is requesting access to Bus A.

At time T3, it is assumed that node 76C requests access to Bus A by inserting a binary 1 into the 01 pattern it has been receiving. When the added binary 1 is detected at node 76B, that node also adds a binary 1 to the pattern it has been sending so that node 76A then receives a repeated 0111 pattern.

At time T3, node 76A has a Downstream Access Request or DAR count of 3, node 76B has a DAR count of 2 and node 76C has a DAR count of 1. The count at a particular node indicates, of course, the current number of nodes downstream of the particular node that are requesting access.

At time T4, it is assumed that a free or idle slot is made available to node 76B by node 76A. Node 76B uses that slot for data it wishes to write onto Bus A. Node 76B then, even if another access request occurs immediately, allows the next two idle slots to pass on Bus A since it knows that two downstream nodes have access requests pending. Node 76B then changes the request bit pattern being transported on Bus B to a repeated 011 pattern to notify node 76A that only two downstream nodes are still requesting access.

When the first of the two idle slots reaches node 76C at time T5, that node uses the idle slot, allows the second idle slot to pass and changes the request bit pattern being transported on Bus B to a repeated 01 pattern.

When the second idle slot reaches node 76D, that node uses the slot and changes the request bit pattern on Bus B to successive 0's. The new or all zero pattern notifies nodes 76A, 76B and 76C that there are no outstanding access requests for Bus A.

There are three salient points about the method. First, each node counts the number of downstream nodes that are requesting access to Bus A simply by counting the number of successive binary 1's in the appropriate bit positions in the request fields of cells received on Bus B. Second, a node that has an access request pending uses the first available idle slot which it detects. Third, that node then allows a number of idle slots to pass equal to the number of pending downstream access requests.

Figure 7A:
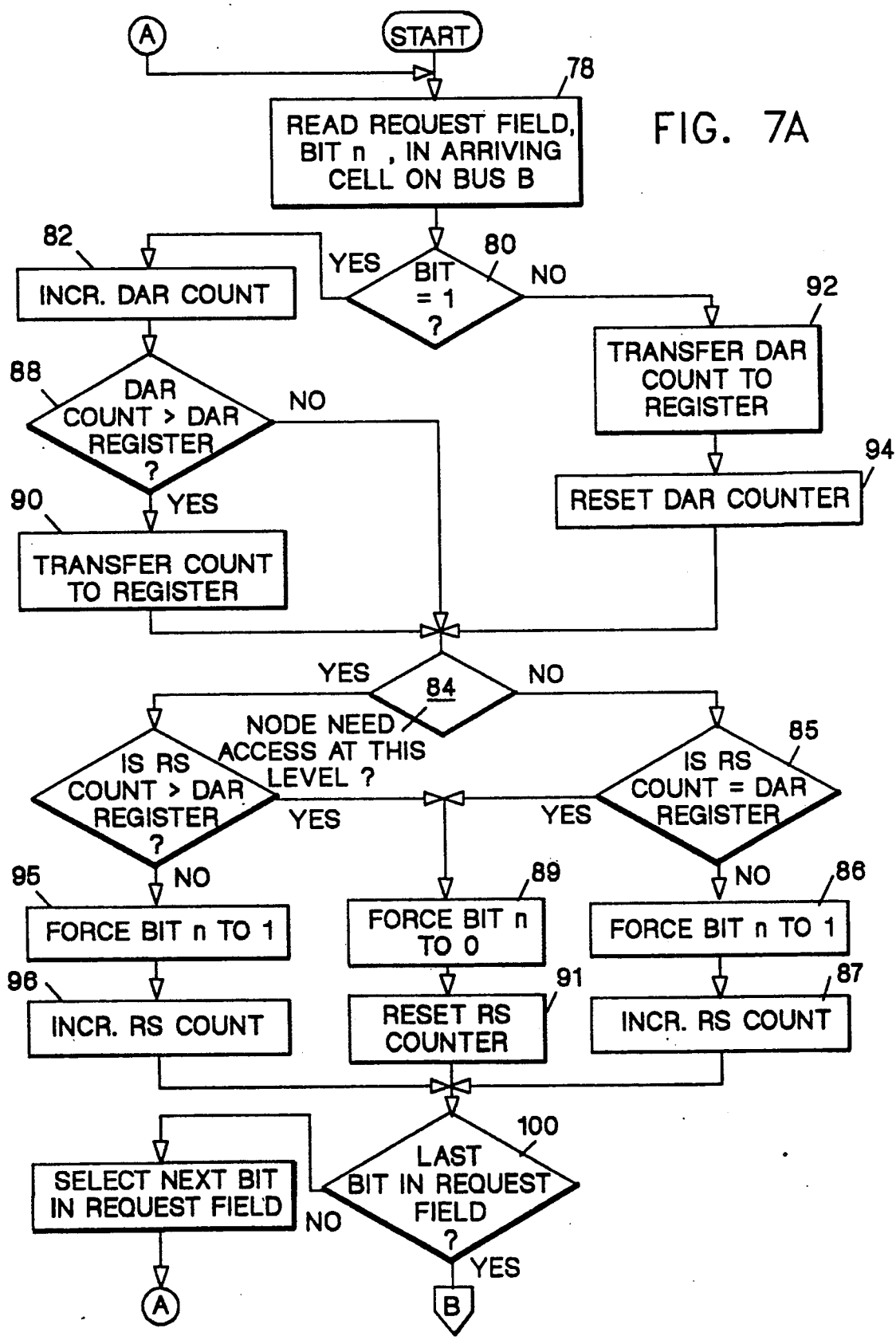
FIG. 7, consisting of FIGS. 7A and 7B taken together, is a flow chart of a method implementing the present invention.
Figure 7B:
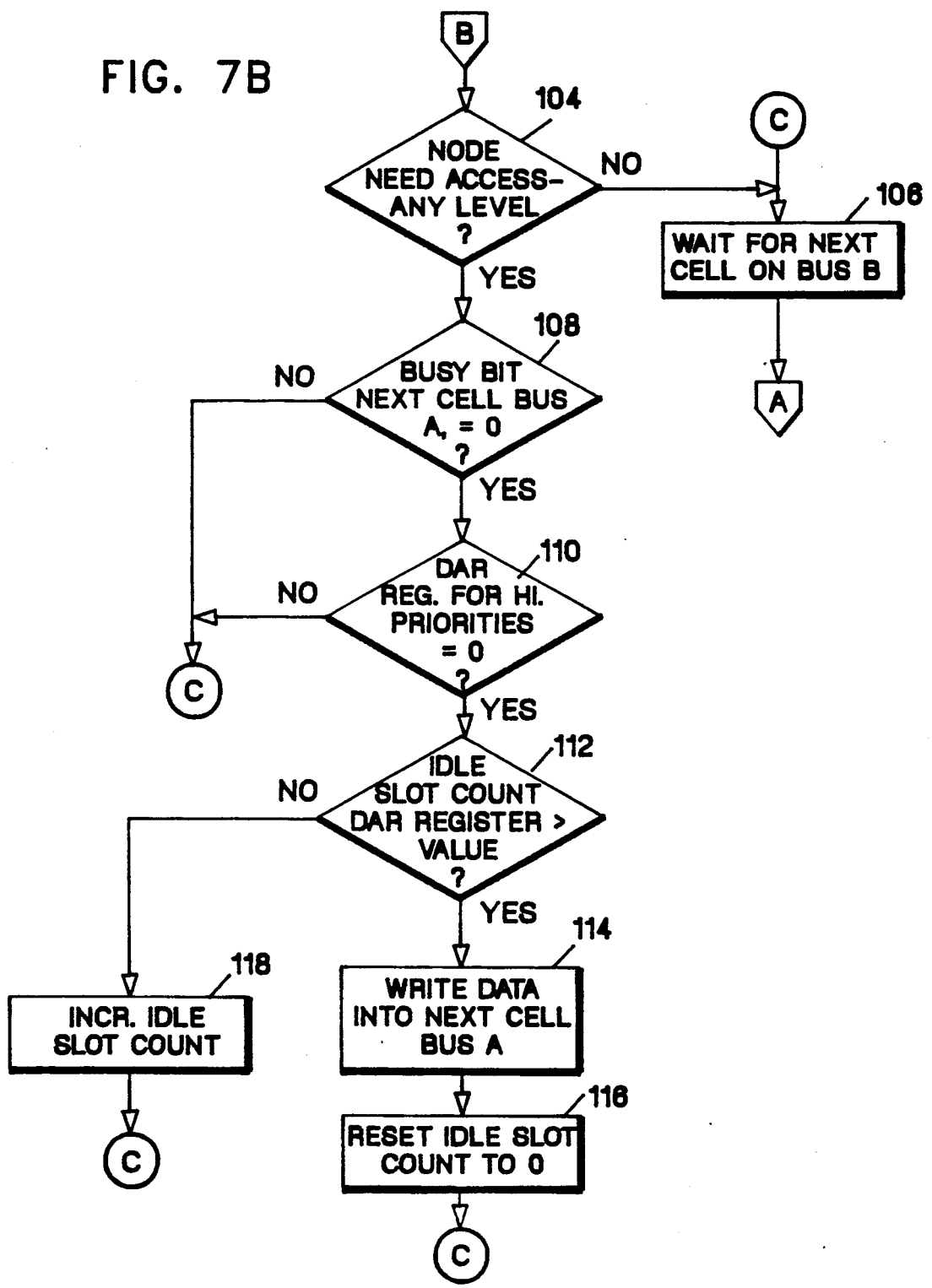

FIG. 7, consisting of FIGS. 7A and 7B taken together, is a flow chart of the steps that are performed at each node in a DQDB system to achieve the above-described operations. Since the operations require processing of multiple cells, it requires a number of iterations of the flow chart to perform even the steps which theoretically happen at what is depicted as a single time in the FIG. 6 time chart.

The first step in the process begins when a cell is received on one of the busses, arbitrarily designated as Bus B. The node reads one of the bits in the four bit request field in an operation 78. If a check 80 shows a bit value of 1, the current count in the Downstream Access Request or DAR counter for the priority level associated with the bit is incremented in an operation 82.

A check 88 is then made to determine whether the current DAR count exceeds a DAR register value established during a prior operation. If the DAR count is greater than the register value, the count is transferred to the register in an operation 90. If the count is less than or the same as the register value, the register value is left unchanged.

If check 80 reveals a binary 0 in the current bit position in the request field, a different series of operations are performed. A binary 0 signals the end of string of successive bus request signals. The DAR count, which then reflects the number of downstream nodes currently requesting access to Bus A, is transferred to the DAR register in operation 92 and the DAR counter is zeroed (operation 94).

A check 84 is made by the node to see if it requires access to Bus A at the priority level defined by the current bit position. If the local node does not require access at the priority level under consideration, the length of the received request string is preserved in the upstream direction. The count in the request string counter is compared to the DAR register value in an operation 85. If the two are not equal (the request string count can only be less than or equal to the DAR register value), a binary 1 is forced into the bit position in the passing cell in operation 86 and the request string count is incremented in an operation 87.

If check 85 shows that the request string count equals the DAR register value, a binary 0 is forced into the passing bit position in operation 89 and the request string counter is reset to zero in an operation 91.

If the local node does require access at the priority level under consideration, the length of the received request string is extended by one in the upstream direction. To accomplish this, a check 93 is made to see whether the current request string count exceeds the DAR register value. If it does, operation 89 forces a binary 0 into the current bit position and the request string counter is reset in operation 91.

If operation 93 indicates the request string count is less than or equal to the DAR register value, a binary 1 is forced into the current bit position in an operation 95 and the request string counter is incremented in an operation 96.

The steps beginning with operation 84 and ending with operations 87, 91 or 96 complete the process of controlling the upstream request sequence and check 100 is then performed to see if all bits in the request field have been read. If not, an operation 102 selects the next bit position (which equates to a different priority level) and the steps beginning with operation 78 and ending at operation 100 are again performed.

When check 100 shows that the request field has been completely read, a further check is made to determine whether the local node is requesting access to Bus A at any priority level. If there are no access requests pending, the system simply waits (operation 106) for the next cell to arrive on Bus B.

If, however, the local node is itself requesting access to Bus A, a series of steps must be performed to determine whether the local node can claim the next available idle slot it receives on Bus A.

The local node monitors the busy bit of each cell it receives on Bus A in an operation 108. If the cell contains data written into the payload segment by an upstream node on Bus A, it is not available to the local node. The local node takes no action, other than to wait for the next cell on Bus B.

If, however, the next cell arriving at the local node is idle, as indicated by a binary 0 in the busy bit position of the access control field the local cell then checks (operation 110) to see whether there are any downstream access requests pending at higher priority levels, as indicated by nonzero values in the local DAR registers assigned to those higher priority levels. A pending downstream access request at a higher priority level preempts the idle slot, forcing the local node to simply wait for the next cell on Bus B.

If there are no pending downstream access requests at a higher priority level, as indicated by zero values in the local DAR registers for those priority levels, the local node may or may not be able to access Bus A depending on the results of the next operation 112.

As noted earlier, a cell which has written data to a bus must then allow a sufficient number of idle slots to pass to service pending downstream access requests at the same priority level. To determine whether a sufficient number of idle slots have passed the local node, an idle slot count is maintained for the number of idle slots that have passed the local node since the last time it loaded data onto the bus. If the idle slot count is found, in operation 112, to be equal to or less than the DAR register value for the same priority level, the idle slot count is incremented in an operation 118 and the local node simply waits for the next cell on Bus B. The idle slot on Bus A is allowed to pass for use by one of the downstream nodes on Bus A.

If, however, operation 112 indicates that the idle slot count exceeds the DAR register value, then the local node is allowed to write to the bus in an operation 114 and the idle slot count is set to zero in an operation 116.

The method described above provides efficient utilization of DQDB busses in the type of system having a four bit request field in the access control field where each of the bits is assigned to a different access priority level. The invention can easily be extended to a fifteen priority level system simply by using the four bits in the request field together to designate one of fifteen priority levels at which a downstream node is requesting access.

To accommodate operation at fifteen priority levels, it is necessary to include a decoder at each node to decode the bit patterns presented by the request field and fifteen sets of DAR counters, DAR registers, request string counters and idle slot counters; that is one set for each priority level. Except for these changes, the same basic method steps would be performed.

While there have been described what are considered to be preferred embodiments of the invention, variations and modifications in those embodiments will occur to those skilled in the art once they are made aware of the basic concepts of the invention. Therefore, it is intended that the appended claims shall be construed to include both the preferred embodiments and all such variations and modifications as fall within the true spirit and scope of the invention.

I claim:

1. For use in a distributed queue dual bus network having two unidirectional oppositely directed busses along which information is transmitted in successive multi-byte cells, each cell having at least one busy bit and at least one bus request bit, and a plurality of parallel nodes, each of said nodes being connected to both of said busses and being capable of reading data from and writing data to the bus, a method of equitably distributing access to the bus among contending nodes, said method being practiced at each node and comprising the steps of:

reading the bus request bit in each cell passing the node on a first bus;

counting the number of successive bus request bits having a first value;

updating a request value register to equal the count whenever the count becomes greater than the current register value or whenever a bus request bit having a second value is encountered;

altering the pattern of bus request bits being transmitted along the first bus only if the node has data to transmit on the second bus, the alteration comprising increasing the number of successive bus request bits having the first value;

reading the busy bit in each cell passing the node on the second bus;

writing data into the first passing cell on the second bus having a busy bit with a first value; and passing all cells having a busy bit with a second value and a number of cells having a busy bit with the first value where the number equals the count stored in the request value register before making another attempt to access the second bus.

2. For use in a distributed queue dual bus network having two unidirectional oppositely directed busses along which information is transmitted in successive multi-byte cells, each cell having at least one busy bit and at least one bus request bit, and a plurality of parallel nodes, each of said nodes being connected to both of said busses and being capable of reading data from and writing data to the bus, a method of equitably distributing access to the bus among contending nodes, said method being practiced at each node and comprising:

means for reading the bus request bit in each cell passing the node on a first bus;

means for counting the number of successive bus request bits having a first value;

means for updating a request value register to equal the count whenever the count becomes greater than the current register value or whenever a bus request bit having a second value is encountered;

means for altering the pattern of bus request bits being transmitted along the first bus only if the node has data to transmit on the second bus, the alteration comprising increasing the number of successive bus request bits having the first value;

means for reading the busy bit in each cell passing the node on the second bus;

means for writing data into the first passing cell on the second bus having a busy bit with a first value; and means for passing all cells having a busy bit with a second value and a number of cells having a busy bit with the first value where the number equals the count stored in the request value register before making another attempt to access the second bus.

* * * * *